United States Patent Office 3,401,205
Patented Sept. 10, 1968

3,401,205
PROCESS FOR PRODUCING CERTAIN 6-CHLORO-3,4 - DIALKYLPHENOLS SUBSTANTIALLY FREE OF ISOMERIC 2-CHLORO-3,4-DIALKYLPHENOLS
Chong Y. Yoon, Kalamazoo, Mich., assignor to The Upjohn Company, Kalamazoo, Mich., a corporation of Delaware
No Drawing. Filed Oct. 20, 1965, Ser. No. 499,031
20 Claims. (Cl. 260—623)

This invention relates to novel processes for producing compositions of matter, and is more particularly concerned with novel processes for producing certain 6-chloro-3,4-dialkylphenols substantially free of isomeric 2-chloro-3,4-dialkylphenols.

One aspect of this invention is a process for removing a phenol of the formula:

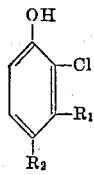

I wherein $R_1$ and $R_2$ are alkyl of 1 to 4 carbon atoms, inclusive, from a mixture comprising said phenol and an isomeric phenol of the formula:

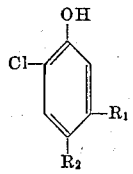

II wherein $R_1$ and $R_2$ are as defined above. Said process comprises the steps, (1) contacting said mixture with at least one molecular equivalent of a sulfonating agent per molecular equivalent of the phenol to be removed to produce a mixture of sulfonated and unsulfonated phenols, and (2) separating the sulfonated phenols from said mixture of sulfonated and unsulfonated phenols.

Another aspect of this invention is a process for producing a first phenol of Formula II substantially free of a second phenol of Formula I. Said process comprises the steps, (1) monochlorinating a phenol of the formula:

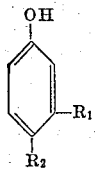

III wherein $R_1$ and $R_2$ are as defined above, to produce a mixture comprising said first phenol and said second phenol, (2) contacting said mixture with at least one molecular equivalent of a sulfonating agent per molecular equivalent of said second phenol in said mixture to produce a mixture of sulfonated and unsulfonated phenols, and (3) separating the sulfonated phenols from said mixture of sulfonated and unsulfonated phenols.

In Formulas I, II, and III, $R_1$ and $R_2$ can be the same or different. Examples of alkyl of 1 to 4 carbon atoms, inclusive, are methyl, ethyl, propyl, butyl, and isomeric forms thereof.

It is known in the art to monochlorinate phenols within the scope of Formula III. See, for example, J. Chem. Soc. London, 1019 (1937). The resulting monochlorophenols are useful as intermediates in the production of insecticidal carbamates. See, for example, U.S. Patent No. 3,131,215.

Monochlorination of a Formula III phenol usually produces a mixture of isomeric monochlorophenols. A 2-chloro-3,4-dialkylphenol and an isomeric 6-chloro-3,4-dialkylphenol usually predominate in such mixtures. In many instances, especially when $R_1$ and $R_2$ in Formulas I and II are methyl, the carbamate of the 6-chloro-3,4-dialkylphenol is more useful as an insecticide than the carbamate of the isomeric 2-chloro-3,4-dialkylphenol. For that reason, it is desirable to separate the 2-chloro-3,4-dialkylphenol from the 6-chloro-3,4-dialkylphenol before transformation of the latter to a carbamate.

2-chloro-3,4-dialkylphenols usually differ sufficiently from the isomeric 6 - chloro-3,4-dialkylphenols in such physical properties as solubilities, boiling point, and partition coefficients to permit a partial separation of the two isomers by a physical method such as fractional distillation, selective extraction, or fractional crystallization. Those methods, however, do not permit economical, large scale, and substantially complete removal of a 2-chloro-3,4-dialkylphenol from a mixture of that compound and the isomeric 6-chloro-3,4-dialkylphenol.

I have now made the surprising and unexpected discovery that partial sulfonation of a mixture of a 2-chloro-3,4 - dialkylphenol and a 6-chloro-3,4-dialkylphenol results in a mixture containing largely sulfonated 2-chloro-3,4-dialkylphenol and unsulfonated 6-chloro-3,4-dialkylphenol. It is possible, as might be expected, to use sulfonation conditions extreme enough to sulfonate all of the molecules in a mixture of a 2-chloro-3,4-dialkylphenol and a 6-chloro-3,4-dialkylphenol. Surprisingly, however, selective sulfonation of the 2-chloro-3,4-dialkylphenol isomer occurs with less extreme conditions.

After partial sulfonation of a mixture of a 2-chloro-3,4 - dialkylphenol and an isomeric 6-chloro-3,4-dialkylphenol, for example, a mixture obtained by monochlorination of the corresponding 3,4-dialkylphenol, the partial sulfonation reaction mixture can be separated readily into a sulfonated phenol fraction and an unsulfonated phenol fraction by any of various methods obvious to one skilled in the art, taking advantage of the expected large differences in physical and/or chemical properties between phenols and phenol sulfonic acids. Since the partial sulfonation results in substantially complete sulfonation of the 2-chloro-3,4-dialkylphenol before any substantial portion of the 6-chloro-3,4-dialkylphenol is sulfonated, the combination of partial sulfonation of a mixture of a 2-chloro-3,4-dialkylphenol and an isomeric 6-chloro-3,4-dialkylphenol, and separation of the resulting sulfonated and unsulfonated phenol fractions gives the more useful 6 - chloro-3,4-dialkylphenol substantially free of the less useful 2 - chloro - 3,4 - dialkylphenol. The sulfonic acid moiety of the sulfonated 2 - chloro - 3,4-dialkylphenol can, if desired, be removed by any of the various aromatic desulfonation procedures known in the art, for example, heating that sulfonic acid with steam or water, preferably acidified and under greater than atmospheric pressure. Thereby, the 2-chloro-3,4-dialkylphenol can be recovered.

Mixtures of a 2-chloro-3,4-dialkylphenol and an isomeric 6-chloro-3,4-dialkylphenol suitable for treatment according to the novel process of this invention can contain any proportions of those two isomers, for example, about 10 percent or even less of the 2-chloro isomer to about 90% or even more of that isomer, the remainder of the mixture being the 6-chloro isomer. Relatively small amounts of other organic substances, for example, nonchlorinated phenols, can be present in the mixture of 2-chloro-3,4-dialkylphenol and isomeric 6-chloro-3,4-dialkylphenol without interfering with the separation of those two chlorophenols. If the other substances are easily sulfonated, they will join the sulfonated 2-chloro-3,4-dialkylphenol; otherwise they will remain with the 6-chloro-3,4-dialkylphenol.

The source of the mixture of 2-chloro-3,4-dialkylphenol and isomeric 6-chloro-3,4-dialkylphenol is not critical, and that mixture can be produced, for example, by nitration of a 3,4-dialkylphenol, followed by reduction of the nitro moieties to amino moieties, and then replacement of amino moieties with chlorine. When economical and large scale production of a 6-chloro-3,4-dialkylphenol is desired, however, it is usually advantageous to produce the mixture of 2-chloro-3,4-dialkylphenol and isomeric 6-chloro-3,4-dialkylphenol by direct monochlorination of the corresponding 3,4-dialkylphenol.

Any of the methods known in the art for phenol monochlorinations can be used to monochlorinate 3,4-dialkylphenols to give mixtures from which the 6-chloro isomer can be separated from the 2-chloro isomer by the novel process of this invention. It is preferred that the chlorination be substantially ionic rather than free radical to avoid chlorination of alkyl moieties. Otherwise, the manner in which the monochlorination is carried out is not a part of the novel process of this invention. One useful procedure comprises interaction of molecular chlorine with the 3,4-dialkylphenol in the presence of an aromatic hydrocarbon, for example, benzene or toluene. That method is especially useful for the monochlorination of 3,4-xylenol, i.e., 3,4-dimethylphenol, usually resulting in production of a monochloro mixture containing about one-half to two-thirds 6-chloro-3,4-xylenol, the remainder being 2-chloro-3,4-xylenol.

Sulfonation of the mixture of 2 - chloro - 3,4 - dialkylphenol and isomeric 6-chloro-3,4-dialkylphenol can be carried out by any of the methods known in the art. See, for example, Groggins, "Unit Processes in Organic Synthesis," McGraw-Hill Book Co., New York, N.Y., 5th Ed., Chapter 7 (1958). There are two essential criteria for the sulfonation conditions, however. At least one molecular equivalent of the sulfonating agent should be used for each molecular equivalent of 2-chloro-3,4-dialkylphenol in the mixture to be partially sulfonated, and the sulfonation conditions must be such as to cause only a partial sulfonation.

With regard to conditions which will cause only a partial sulfonation, the illustrative embodiments set forth hereinafter result in formation of a partial sulfonation reaction mixture wherein substantially all, i.e., more than about 95%, of the 2-choloro-3,4-dialkylphenol in the mixture has been sulfonated and wherein substantially all, i.e., more than about 95%, of the 6-chloro-3,4-dialkylphenol in the mixture remains unsulfonated. Other sulfonation conditions will, of course, give similar results, and the novel process of this invention is not to be construed as being limited to the specific sulfonation conditions set forth hereinafter. Once made aware of the above-described unexpected behavior of a mixture of 2-chloro-3,4-dialkylphenol and 6-chloro-3,4-dialkylphenol toward sulfonation, one skilled in this art can readily choose sulfonation conditions other than those described in the illustrative embodiments herein, and can control those conditions to give an incomplete or partial sulfonation of said mixture. Operable sulfonation conditions are those which give partial sulfonation and which use at least enough sulfonating agent to sulfonate all of the 2-chloro-3,4-dialkylphenol in the phenol mixture.

With regard to sulfonating agents, any of the agents known to the art can be used. See Groggins, ibid. Because of superior cost advantages and ease of operation, concentrated sulfuric acid, i.e., about 90 to 100% sulfuric acid, is a preferred sulfonating agent. Other especially useful sulfonating agents are chlorosulfonic acid, oleum, and sulfur trioxide, the latter either alone or as an adduct with various organic compounds, e.g., tertiary amines such as pyridine or N,N-dimethylaniline.

The amount of sulfonating agent is not critical as long as enough agent is used to sulfonate all of the 2-chloro-3,4-dialkylphenol in the mixture of phenols to be treated. About one to about five molecular equivalents of sulfonating agent per molecular equivalent of 2-chloro-3,4-dialkylphenol is the preferred range. There is usually no reason to use a substantially larger amount of sulfonating agent, and a larger amount usually results in an unnecessary increase in cost and size of the reaction vessel, and inconvenience in recovery of the desired unsulfonated 6-chloro-3,4-dialkylphenol.

The amount of 2-chloro-3,4-dialkylphenol in a mixture of that compound and the isomeric 6-chloro-3,4-dialkylphenol can readily be determined by gas-liquid chromatography. For example, 2-chloro-3,4-xylenol has a distinctly shorter retention time than 6-chloro-3,4-xylenol when a mixture of those is subjected to gas-liquid chromatography on an 8 ft. by 0.25 inch glass column packed with a silanized, 80 to 100-mesh, diatomaceous earth containing 3 percent by weight of a polyamide resin (Gas Chrom. Z, a product of Applied Science Labs., State College, Pa.). Advantageously, said gas-liquid chromatography is carried out with a 100° C. column temperature, helium as the carrier gas, a hydrogen flame ionization detector, and biphenyl as an internal standard for calibration.

The partial sulfonation can be carried out in the presence or absence of a relatively inert liquid diluent. Since the 2-chloro-3,4-dialkylphenol is usually easily sulfonated, the diluent need not be one which is completely inert to sulfonation. For example, benzene and toluene are useful diluents for this purpose. Other suitable diluents are the various alkane fractions, e.g., hexane, heptane, octane, petroleum ether, ligroin, and the like; halogenated hydrocarbons, e.g., chloroform, carbon tetrachloride, perchloroethylene, 1,2-dichloroethane, chlorobenzene, dichlorobenzene, and the like; and alicyclic hydrocarbons without ethylenic or acetylenic unsaturation, e.g., cyclohexane and tetrahydronaphthalene.

When concentrated sulfuric acid is used as the sulfonating agent, a reaction temperature in the range about 0° to about 200° C. is operable. A temperature range about 50° to about 100° C. is preferred.

When no diluent is used, the mixture of 2-chloro-3,4-dialkylphenol and 6-chloro-3,4-dialkylphenol, plus any unchlorinated 3,4-dialkylphenol and dichloro-3,4-dialkylphenol if the mixture is prepared by chlorination of 3,4-dialkylphenol, is melted by warming. The sulfonating agent, advantageously, concentrated sulfuric acid, is then added, and the resulting mixture is stirred and heated within the desired temperature range until substantially all of the 2-chloro-3,4-dialkylphenol has been sulfonated. That point can be determined by taking small aliquots of the reaction mixture at periodic intervals, separating the sulfonated from the unsulfonated phenols as described hereinafter, and then estimating the 2-chloro-3,4-dialkylphenol in the unsulfonated phenol fraction by gas-liquid chromatography as described above.

When a diluent is used, it is advantageous to use enough to dissolve the mixture of chloro-3,4-dialkylphenols. The sulfonating agent is then added, and the mixture is heated within the desired reaction temperature range until the desired sulfonation is complete, that point being determined as described above.

Water is a byproduct during some sulfonations, for example, when sulfuric acid is used. If that water is allowed to accumulate during sulfonation, the rate of sulfonation will usually gradually decrease. It is therefore often advantageous to remove that water by azeotropic distillation during sulfonation, either trapping the water during reflux, or distilling diluent plus water and adding fresh diluent. For that reason, it is also advantageous to use a diluent whose boiling point is within the desired reaction temperature range or to adjust the pressure above the reaction mixture to permit boiling and thus reflux or distillation of diluent and byproduct water at the desired reaction temperature.

The reaction time necessary for substantially complete sulfonation of the 2-chloro-3,4-dialkylphenol without substantial sulfonation of the isomeric 6-chloro-3,4-dialkylphenol will depend upon such factors as the sulfonation temperature, the nature of the sulfonation reagent, the nature and amount of diluent if one is used, and the nature of the alkyl substituents of the monochloro-3,4-dialkylphenol. For a mixture of about 1 part of 2-chloro-3,4-xylenol and 2 parts of 6-chloro-3,4-xylenol with 98 percent sulfuric acid at about 70° C., about 3 hours is sufficient to sulfonate substantially all of the 2-chloro-3,4-xylenol without substantial sulfonation of the 6-chloro-3,4-xylenol.

When sulfonation of the 2-chloro-3,4-dialkylphenol is substantially complete, the sulfonated 2-chloro-3,4-dialkylphenol can be separated from the unsulfonated 6-chloro-3,4-dialkylphenol by methods which take advantage of the substantial chemical and physical property differences between phenols and phenol sulfonic acids. Suitable methods will be generally obvious to one skilled in this art. For example, when concentrated sulfuric acid is used as a sulfonating agent, cooling of the partial sulfonation reaction mixture often yields a mixture of solid 6-chloro-3,4-dialkylphenol and a liquid containing the sulfonic acid and excess sulfuric acid. Those two phases can easily be separated by filtration or centrifugation. It is advantageous, however, to mix a partial sulfonation reaction mixture with about one to about 5 volumes of water per volume of reaction mixture. Unexpectedly large yields of the 6-chloro isomer are thereby obtained. When no liquid diluent has been used during the sulfonation, this addition of water usually results in the formation of two separate phases, the aqueous phase being liquid and containing the sulfonated 2-chloro-3,4-dialkylphenol and excess sulfonating agent or the product of its reaction with water, and the non-aqueous phase being solid or liquid and being largely the unsulfonated 6-chloro-3,4-dialkylphenol. When a liquid diluent has been used during the sulfonation, this addition of water usually results in the formation of two liquid phases, an aqueous phase as described above and a non-aqueous phase containing the diluent and the unsulfonated 6-chloro-3,4-dialkylphenol. In either case, the two phases can readily be separated by the usual mechanical means.

The 6-chloro-3,4-dialkylphenol substantially free of 2-chloro-3,4-dialkylphenol can, if desired, be freed of diluent, if one is present, by conventional evaporation or distillation. It is advantageous, however, first to remove traces of acid from the diluent phase by washing with water and a weak base, for example, sodium bicarbonate. The 6-chloro-3,4-dialkylphenol can then be purified, if desired, by conventional methods, for example, distillation or crystallization from a suitable solvent or mixture of solvents. The sulfonated 2-chloro-3,4-dialkylphenol can be separated from any excess sulfonating agents and purified, if desired, by methods known in the art. See, for example, Groggins, ibid., pp. 362–364. The sulfonated 2-chloro-3,4-dialkylphenol can also be desulfonated, if desired, by methods known in the art. See, for example Groggins, ibid., pp. 358–362.

An example of the preparation of a mixture of a 2-chloro-3,4-dialkylphenol and a 6-chloro-3,4-dialkylphenol is as follows:

PREPARATION 1
Chlorination of 3,4-xylenol

Gaseous chlorine (14 g.) was introduced below the surface of a stirred solution of 3,4-xylenol (24.4 g.) in 350 ml. of benzene at 5° C. during 35 minutes. The resulting cold, pale yellow reaction mixture was extracted successively with two 100-ml. portions of water, one 100-ml. portion of saturated aqueous sodium bicarbonate solution, and two 50-ml. portions of 10 percent aqueous sodium hydroxide solution. The water and sodium bicarbonate extracts were discarded. The combined sodium hydroxide extracts were neutralized with concentrated hydrochloric acid and then steam distilled. About 700 ml. of distillate was collected. The steam distillate was extracted with three 100-ml. portions of chloroform. The combined chloroform extracts were dried and evaporated at reduced pressure to give 22.9 g. of a reddish-yellow oil containing about 5 percent unreacted 3,4-xylenol and about 95 percent of a mixture of 2-chloro-3,4-xylenol and 6-chloro-3,4-xylenol.

Following the above procedure, but using in place of 3,4-xylenol, 3,4-diethylphenol; 4-ethyl-3-methylphenol; 3-ethyl-4-methylphenol; 3,4-diisopropylphenol, and 3,4-dibutylphenol, there are obtained mixtures of the corresponding 2-chloro and 6-chloro isomers.

The invention can be more fully understood by the following examples.

EXAMPLE 1

A mixture (40 g.) of 2-chloro-3,4-xylenol (one part) and 6-chloro-3,4-xylenol (2 parts) was dissolved in 200 ml. of benzene. Concentrated (98%) sulfuric acid (16 ml.) was added, and the resulting mixture was heated at the boiling point with reflux for 2 hours, the water produced thereby being removed by a trap in the reflux condensate return (Dean-Stark design).

At the end of the reflux period, 200 ml. of water was added to the reaction mixture, and the mixture resulting therefrom was cooled with stirring to about 25° C. The two liquid phases were separated. The benzene phase contained 100 percent of the 6-chloro-3,4-xylenol originally present in the phenol reactant mixture, and was substantially free of 2-chloro-3,4-xylenol.

The 6-chloro-3,4-xylenol was isolated by washing the benzene solution once with 100 ml. of 5 percent aqueous sodium bicarbonate solution and twice with 100-ml. portions of water, followed by distillation of the benzene to give 6-chloro-3,4-xylenol.

Following the procedure of Example 1 but omitting the addition of the 200 ml. of water to the sulfonation reaction mixture, the separated benzene phase contained about 80 percent of the 6-chloro-3,4-xylenol originally present in the phenol reactant mixture. That benzene phase was substantially free of 2-chloro-3,4-xylenol.

Following the procedure of Example 1 but substituting for the reactant mixture of 2-chloro-3,4-xylenol and 6-chloro-3,4-xylenol, mixtures containing a major amount of the 6-chloro isomer and a minor amount of the 2-chloro isomer of monochloro-3,4-diethylphenol; monochloro-4-ethyl-3-methylphenol; monochloro - 3 - ethyl - 4 - methylphenol; monochloro - 3,4 - diisopropylphenol; and monchloro-3,4-dibutylphenol, there are obtained in each case, the 6-chloro isomer substantially free of the 2-chloro isomer.

EXAMPLE 2

A solid mixture (100 g.) of 2-chloro-3,4-xylenol (30 percent), and 6-chloro-3,4-xylenol (62 percent; the remaining 8 percent consisting of 3,4-xylenol and other phenolic and nonphenolic impurities) was heated to 70° C. Concentrated (98 percent) sulfuric acid (20 ml.) was added, and the resulting mixture was heated and stirred at 70° C. for 3 hours.

At the end of the heating period, 75 ml. of water was added to the reaction mixture, and the resulting slurry was cooled to 25° C. and stirred for 2 hours. The slurry was then filtered, and the filter cake was washed with water and dried to give 57 g. of 6-chloro-3,4-xylenol which was substantially free of 2-chloro-3,4-xylenol and the original phenolic impurities.

EXAMPLE 3

A solid mixture (100 g.) of 2-chloro-3,4-xylenol (28.0 percent) and 6-chloro-3,4-xylenol (69.4 percent; the remaining 2.6 percent consisting of other phenolic and nonphenolic impurities) was heated to 70° C. Concentrated (98 percent) sulfuric acid (15 ml.) was added, and the resulting mixture was heated and stirred at 70° C. for 3 hours.

At the end of the heating period, 150 ml. of water was added slowly to the reaction mixture, and the resulting slurry was cooled. At 40° C., the slurry set to a solid mass. Further addition of 60 ml. of water and 2 hours of further stirring at 25° C. gave a slurry which was filtered. The filter cake was washed and dried at reduced pressure to give 61.3 g. of 6-chloro-3,4-xylenol, essentially free of 2-chloro-3,4-xylenol and other phenolic impurities, i.e., containing less than one percent of those substances.

Following the procedure of Example 3 but substituting for the reactant mixture of 2-chloro-3,4-xylenol and 6-chloro-3,4-xylenol, mixtures containing a major amount of the 6-chloro isomer and a minor amount of the 2-chloro isomer of monochloro-3,4-diethylphenol; monochloro-4-ethyl-3-methylphenol; monochloro-3-ethyl-4 - methylphenol; monochloro-3,4-diisopropylphenol; and monochloro-3,4-dibutylphenol, there are obtained in each case, the 6-chloro isomer substantially free of the 2-chloro isomer.

I claim:

1. A process for removing a phenol of the formula:

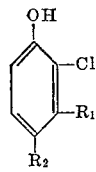

wherein $R_1$ and $R_2$ are alkyl of 1 to 4 carbon atoms, inclusive, from a mixture comprising said phenol and an isomeric phenol of the formula:

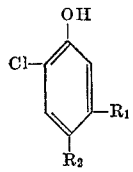

wherein $R_1$ and $R_2$ are as defined above, which comprises the steps, (1) contacting said mixture with at least one molecular equivalent of a sulfonating agent per molecular equivalent of the phenol to be removed to produce a mixture of sulfonated and unsulfonated phenols, and (2) separating the sulfonated phenols from said mixture of sulfonated and unsulfonated phenols.

2. The process of claim 1 wherein said sulfonating agent is concentrated sulfuric acid.

3. The process of claim 2 wherein step (2) comprises addition of water to the mixture of sulfonated and unsulfonated phenols, followed by separation of the resulting aqueous and non-aqueous phases.

4. The process of claim 2 wherein step (1) is carried out in the presence of an inert organic liquid diluent.

5. The process of claim 4 wherein water is removed by azeotropic distillation during step (1).

6. The process of claim 4 wherein step (2) comprises addition of water to the mixture of sulfonated and unsulfonated phenols, followed by separation of the resulting aqueous and non-aqueous phases.

7. The process of claim 1 wherein $R_1$ and $R_2$ in both phenols are methyl.

8. A process for removing 2-chloro-3,4-xylenol from a mixture comprising 2-chloro-3,4-xylenol and 6-chloro-3,4-xylenol which comprises the steps, (1) mixing said mixture with at least one molecular equivalent of concentrated sulfuric acid per molecular equivalent of 2-chloro-3,4-xylenol in said mixture to produce a mixture of sulfonated and unsulfonated phenols, (2) mixing the total mixture resulting from step (1) with at least one volume of water per volume of concentrated sulfuric acid used in step (1), and (3) separating the aqueous and non-aqueous phases resulting from step (2), the non-aqueous phase being substantially free of 2-chloro-3,4-xylenol.

9. The process of claim 8 wherein step (1) is carried out in the presence of an inert organic liquid diluent.

10. The process of claim 9 wherein water is removed by azeotropic distillation during step (1).

11. A process for producing a first phenol of the formula:

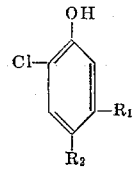

wherein $R_1$ and $R_2$ are alkyl of 1 to 4 carbon atoms, inclusive, substantially free of a second phenol of the formula:

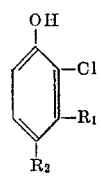

wherein $R_1$ and $R_2$ are as defined above, which comprises the steps, (1) monochlorinating a phenol of the formula:

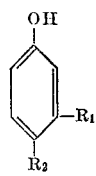

wherein $R_1$ and $R_2$ are as defined above, to produce a mixture comprising said first phenol and said second phenol, (2) contacting said mixture with at least one molecular equivalent of a sulfonating agent per molecular equivalent of said second phenol in said mixture to produce a mixture of sulfonated and unsulfonated phenols, and (3) separating the sulfonated phenols from said mixture of sulfonated and unsulfonated phenols.

12. The process of claim 11 wherein said sulfonating agent is concentrated sulfuric acid.

13. The process of claim 12 wherein step (3) comprises addition of water to the mixture of sulfonated and unsulfonated phenols, followed by separation of the resulting aqueous and non-aqueous phases.

14. The process of claim 12 wherein step (2) is carried out in the presence of an inert organic liquid diluent.

15. The process of claim 14 wherein water is removed by azeotropic distillation during step (2).

16. The process of claim 14 wherein step (3) comprises addition of water to the mixture of sulfonated and unsulfonated phenols, followed by separation of the resulting aqueous and non-aqueous phases.

17. The process of claim 11 wherein $R_1$ and $R_2$ in both phenols are methyl.

18. A process for producing 6-chloro-3,4-xylenol substantially free of 2-chloro-3,4-xylenol which comprises the steps, (1) monochlorinating 3,4-xylenol to produce a mixture comprising 2-chloro-3,4-xylenol and 6-chloro-3,4-xylenol, (2) contacting the monochloroxylenol mixture resulting from step (1) with at least one molecular equivalent of concentrated sulfuric acid per molecular equivalent of 2-chloro-3,4-xylenol in said mixture to produce a mixture of sulfonated and unsulfonated monochloroxylenols, (3) mixing the total mixture resulting from step (2) with at least one volume of water per volume of concentrated sulfuric acid used in step (2), and (4) separating the aqueous and non-aqueous phases resulting from step (3), the non-aqueous phase being substantially free of 2-chloro-3,4-xylenol.

19. The process of claim 18 wherein step (2) is carried out in the presence of an inert organic liquid diluent.

20. The process of claim 19 wherein water is removed by azeotropic distillation during step (2).

References Cited

UNITED STATES PATENTS 2,350,677  6/1944  Gladden _____ 260—623
3,159,685  12/1964  Bradley _____ 260—512

LEON ZITVER, *Primary Examiner.*

W. B. LONE, *Assistant Examiner.*